(12) United States Patent
Bao et al.

(10) Patent No.: US 12,494,015 B2
(45) Date of Patent: Dec. 9, 2025

(54) INFORMATION GENERATION METHOD AND DEVICE

(71) Applicant: SAMSUNG ELECTRONICS CO., LTD., Suwon-si (KR)

(72) Inventors: Junyan Bao, Nanjing (CN); Weiyi Gu, Nanjing (CN); Jie Fan, Nanjing (CN); Suqin Xu, Nanjing (CN); Leiming Li, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 18/218,880

(22) Filed: Jul. 6, 2023

(65) Prior Publication Data

US 2023/0377255 A1 Nov. 23, 2023

Related U.S. Application Data

(63) Continuation of application No. PCT/KR2023/006865, filed on May 19, 2023.

(30) Foreign Application Priority Data

May 20, 2022 (CN) .......................... 202210555580.5

(51) Int. Cl.
*G06T 7/70* (2017.01)
*G06F 3/01* (2006.01)
(Continued)

(52) U.S. Cl.
CPC .............. *G06T 17/00* (2013.01); *G06F 3/016* (2013.01); *G06T 7/70* (2017.01); *G06V 10/761* (2022.01); *G06T 2207/30201* (2013.01)

(58) Field of Classification Search
CPC ......... G06T 7/70; G06T 19/006; G06F 3/016; G06F 3/015; G06V 10/761
See application file for complete search history.

(56) References Cited

U.S. PATENT DOCUMENTS

| 10,031,580 B2 | 7/2018 | Cruz-Hernandez |
| 11,138,777 B2 | 10/2021 | Xu |

(Continued)

FOREIGN PATENT DOCUMENTS

| CN | 103544346 A | 1/2014 |
| CN | 105630145 A | 6/2016 |

(Continued)

OTHER PUBLICATIONS

International Search Report (PCT/ISA/210) and Written Opinion (PCT/ISA/237) issued by the International Searching Authority on Sep. 11, 2023 in corresponding International Application No. PCT/KR2023/006865.

(Continued)

*Primary Examiner* — Antonio A Caschera
(74) *Attorney, Agent, or Firm* — Sughrue Mion, PLLC

(57) ABSTRACT

An information generation method includes acquiring relative position information on a user relative to a target object in a virtual environment, determining sensory information corresponding to the target object based on the relative position information and the attribute information on the target object, and converting the sensory information into electrical signals to stimulate the user through the brain-machine interface device. Accordingly, the method helps the user experience the attributes of the object in the virtual environment and improves the authenticity of the interaction.

16 Claims, 7 Drawing Sheets

(51) Int. Cl.
    *G06T 17/00*     (2006.01)
    *G06V 10/74*     (2022.01)

(56) References Cited

U.S. PATENT DOCUMENTS

| | | |
|---|---|---|
| 11,294,451 B2 | 4/2022 | Lee |
| 11,543,879 B2 | 1/2023 | Lee |
| 11,592,902 B2 | 2/2023 | Daniels |
| 11,914,773 B2 | 2/2024 | Lee et al. |
| 2011/0279249 A1 | 11/2011 | Kipman et al. |
| 2017/0113056 A1 | 4/2017 | Stocco et al. |
| 2018/0091924 A1 | 3/2018 | Hammerschmidt |
| 2018/0150131 A1* | 5/2018 | Ranieri .............. G06F 3/017 |
| 2020/0205319 A1 | 6/2020 | Pouilly et al. |
| 2020/0330860 A1 | 10/2020 | Flego et al. |
| 2021/0216132 A1 | 7/2021 | Dean et al. |
| 2021/0297805 A1* | 9/2021 | Nitta .............. H04S 7/304 |
| 2021/0365681 A1 | 11/2021 | Huo et al. |
| 2022/0054830 A1 | 2/2022 | Gooie |

FOREIGN PATENT DOCUMENTS

| | | |
|---|---|---|
| CN | 107239145 A | 10/2017 |
| CN | 112071326 A | 12/2020 |
| CN | 114816074 A | 7/2022 |
| KR | 10-2022-0030641 A | 3/2022 |
| WO | 2015/044851 A2 | 4/2015 |

OTHER PUBLICATIONS

Communication issued on Oct. 18, 2024 from the China National Intellectual Property Administration for Chinese Patent Application No. 202210555580.5.

Communication issued on Nov. 22, 2024 from the China National Intellectual Property Administration for Chinese Patent Application No. 202210555580.5.

Communication dated Apr. 19, 2024, issued by the State Intellectual Property Office of China in Chinese Application No. 202210555580.5.

Extended European Search Report issued Jun. 3, 2025 by the European Patent Office for EP Patent Application No. 23807952.9.

* cited by examiner

INFORMATION GENERATION METHOD AND DEVICE

CROSS-REFERENCE TO RELATED APPLICATIONS

This application is a continuation of International Application No. PCT/KR2023/006865 designating the United States, filed on May 19, 2023, in the Korean Intellectual Property Receiving Office and claiming priority to Chinese Patent Application No. 202210555580.5 filed on May 20, 2022, in the China National Intellectual Property Administration. The disclosures of each of these applications are incorporated by reference herein in their entireties.

BACKGROUND

1. Field

The disclosure relates to a field of computer technologies, in particular, to a field of virtual reality technologies, and more particularly, to an information generation method and apparatus.

2. Description of Related Art

In related art virtual reality (VR) technologies, various sensory senses of a human body in a virtual space are simulated. For example, auditory sensing mainly depends on a stereo microphone, a microphone, etc., which are used to acquire sound data and determine spatial position information on a source of the sound, tactile sensing primarily relies on visual sensors, touching sensors, slip sensors, etc. for tactility judgment, and taste and olfactory sensing primarily relies on chemical sensors.

Accordingly, in the related art VR technologies, various sensory simulations are realized in a virtual space mainly based on the use of sensors, and each of the sensory simulations is realized by a kind of sensor, which is cumbersome. In addition, the sensors are not comprehensive, and thus there are many simulations that cannot be realized. Accordingly, the effect obtained by using these sensors is far from reality, and the user cannot obtain a real simulation, such as material quality, texture and smoothness of a certain virtual object in the tactility sense.

SUMMARY

Embodiments of the disclosure provide an information generation method, apparatus, device, and storage medium.

According to an aspect of the disclosure, there is provided an information generation method including: acquiring position information of a user in a virtual environment; determining sensory information corresponding to a target object in the virtual environment based on attribute information of the target object and the position information of the user; and converting the sensory information into electrical signals to stimulate the through a brain-machine interface device.

The determining the sensory information corresponding to the target object in the virtual environment may include: obtaining relative position information between the position information of the user and a position information of the target object; and determining the sensory information corresponding to the target object based on the relative position information and the attribute information of the target object.

The determining the sensory information corresponding to the target object based on the relative position information and the attribute information on the target object may include: determining tactile information corresponding to an outline attribute of the target object as the sensory information corresponding to the target object, based on determining that a distance between a hand of the user and the target object satisfies a threshold and determining that the target object has the outline attribute.

The determining the sensory information corresponding to the target object based on the relative position information and the attribute information on the target object may include: determining olfactory information corresponding to the target object based on an orientation of a face of the user and a distance between a head of the user and the target object, based on determining that the target object has an odor attribute; and determining the olfactory information as the sensory information corresponding to the target object.

The determining the sensory information corresponding to the target object based on the relative position information and the attribute information on the target object may include: determining auditory information corresponding to the target object based on an orientation of a face of the user and a distance between a head of the user and the target object, based on determining that the target object has a sound attribute; and determining the auditory information as the sensory information corresponding to the target object.

The orientation of the face of the user may be determined by: determining first coordinates corresponding to a left side of the head of the user based on a first wearable position device on a left side of the head of the user and second coordinates corresponding to a right side of the head of the user based on a second wearable position device on a right side of the head of the user; and determining the orientation of the face of the user based on an angle between a line connecting, the first coordinates and the second coordinates, and a direction of a plane, in which third coordinates of the target object are located.

The distance between a head of the user and the target object may be determined by: determining first coordinates corresponding to a left side of the head of the user based on a first wearable position device on a left side of the head of the user and second coordinates corresponding to a right side of the head of the user based on a second wearable position device on a right side of the head of the user; and determining the distance between the head of the user and the target object based on a distance between third coordinates of the target object and a midpoint between the first coordinates and the second coordinates.

The determining the sensory information corresponding to the target object based on the relative position information and the attribute information on the target object may include: determining taste information corresponding to an edible attribute of the target object as the sensory information corresponding to the target object based on determining that the target object is in a position on a head of the user and that the target object has the edible attribute.

According to another aspect of the disclosure, there is provided a non-transitory computer readable storage medium storing computer instructions for causing the computer to perform a method including acquiring position information of a user in a virtual environment; determining sensory information corresponding to a target object in the virtual environment based on attribute information of the target object and the position information of the user; and converting the sensory information into electrical signals to stimulate the through a brain-machine interface device.

According to another aspect of the disclosure, there is provided an information generating apparatus including: an acquisition circuit configured to acquire position information of a user in a virtual environment; a determining circuit configured to determine sensory information corresponding to a target object in the virtual environment based on attribute information of the target object and the position information of the user; and a conversion circuit configured to convert the sensory information into electrical signals to stimulate the through a brain-machine interface device.

According to another aspect of the disclosure, there is provided an electronic device including: a memory storing one or more instructions and at least one processor configured to execute the one or more instructions to: acquire position information of a user in a virtual environment; determine sensory information corresponding to a target object in the virtual environment based on attribute information on the target object and the position information of the user; and convert the sensory information into electrical signals to stimulate the through a brain-machine interface device.

It is to be understood that the description in this section does not intend to identify key or critical features of the embodiments of the disclosure, nor does it intend to limit the scope of the disclosure. Other features of the disclosure will become readily apparent from the following description.

DETAILED DESCRIPTION

Exemplary embodiments of the disclosure are described below in reference to the accompanying drawings, and various details of the embodiments of the disclosure are included to facilitate understanding of the disclosure and are to be considered as exemplary only. Accordingly, the ordinary skilled in the art shall recognize that various changes and modifications may be made to the embodiments described herein without departing from the scope and spirit of the disclosure. Also, for clarity and conciseness, descriptions of well-known functions and structures are omitted in the following description.

It should be noted that the embodiments in the disclosure and the features in the embodiments may be combined with each other unless these to-be combined embodiments or features conflict against each other. The disclosure will now be described in detail with reference to the accompanying drawings and embodiments.

Figure 1:
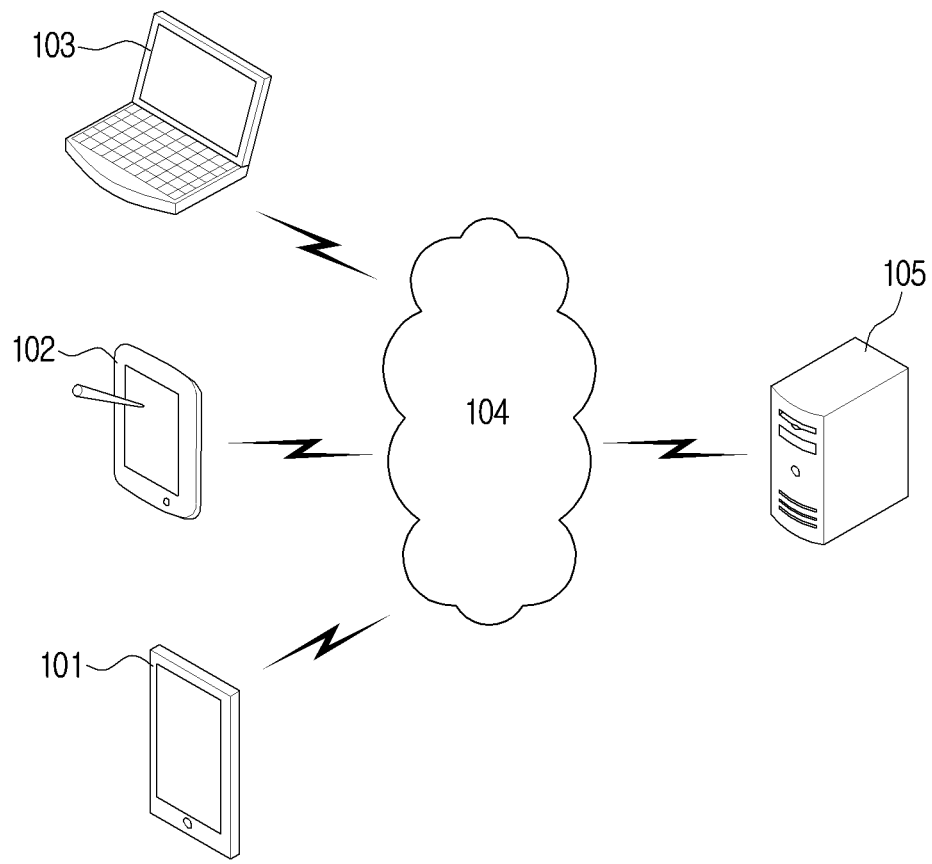
FIG. 1 is diagram illustrating a system architecture according to an example embodiment of the disclosure.

FIG. 1 illustrates a system architecture 100 for implementing an information generation method according to an example embodiment.

As shown in FIG. 1, the system architecture 100 may include terminal devices 101, 102, and 103, a network 104, and a server 105. The network 104 serves as a medium or an interface for providing a communication link between the terminal devices 101, 102, 103 and the server 105, and between these terminal devices. Network 104 may include various types of connections, such as wired or wireless communication links, or fiber optic cables. However, the disclosure is not limited thereto, and as such, other types of connection for communication may be implemented by the network 104. Although three terminal devices 102, 102 and 103 are illustrated, the disclosure is not limited thereto, and as such, according to another example embedment, the number of terminal devices may be less than three or more than three.

The user may use one or more of the terminal devices 101, 102, 103 to interact with other terminal devices or servers 105 through the network 104. For example, the user may use one or more of the terminal devices 101, 102, 103 to receive information from another external device, such as the server 104 of other terminal devices, via the network 104. Also, the user may use one or more of the terminal devices 101, 102, 103 to transmit information to another external device, such as the server 104 of other terminal devices, via the network 104. According to an example embodiment, the information may be messages, data, or content such as multimedia content. The client application software, such as video playback application software, communication application software, and other software, may be installed on the terminal devices 101, 102, and 103.

According to an example embodiment, the terminal devices 101, 102, and 103 may be hardware or software. For example, in a case, the terminal devices 101, 102, and 103 are hardware, various electronic devices may be used, including but not limited to a smartphone, a smart band, AR glasses, VR head display, a tablet computer, a laptop computer, a desktop computer, and the like. In a case the terminal devices 101, 102, and 103 are software, the software may be installed in various electronic devices, including but not limited to a smartphone, a smart band, AR glasses, VR head display, a tablet computer, a laptop computer, a desktop computer, and the like. The software may be implemented as a plurality of software or software modules, or as a single software or software module. However, the disclosure is not limited thereto, and as such, according to another example embodiment, the software may be implement in a various different manner. According to an example embodiment, the terminal devices 101, 102, 103 may be implemented as a combination of hardware and software.

The server 105 may be a server configured to provide various services. For example, the server may be configured to acquire relative position information of a user relative to a target object in a virtual environment, determine sensory information corresponding to the target object based on the relative position information and the attribute information on the target object, and convert the sensory information into electrical signals to stimulate the user through the brain-machine interface device.

According to an example embodiment, the server 105 may be hardware, software or a combination of hardware and software. In a case, the server 105 is implemented as a hardware, the server 105 may be implemented as a distributed server cluster of multiple servers, or it may be implemented as a single server. In a case, the server is implemented as software, the server 105 may be implemented as a plurality of software or software modules, or it may be implemented as a single software or software module. According to an example embodiment, the software may include instruction code or software code for providing information generation services. However, the disclosure is not limited thereto, and as such, according to another example embodiment, the software may be implement in a various different manner.

According to an example embodiment, the information generation method may be executed by the server 105, may be executed by the terminal devices 101, 102, 103, or may be executed by the server 105 and the terminal devices 101, 102, 103 in cooperation with each other. Accordingly, the parts (e.g., each unit, sub-unit, module, and sub-module) included in the information generation apparatus may be all provided in the server 105, or may be all provided in the terminal devices 101, 102, and 103, or may be respectively provided in the server 105 and the terminal devices 101, 102, and 103.

It should be understood that the number of terminal devices, networks and servers in FIG. 1 is merely illustrative. As such, according to another example embodiment, there may be any number of terminal devices, networks, and servers as desired for implementation.

Figure 2:
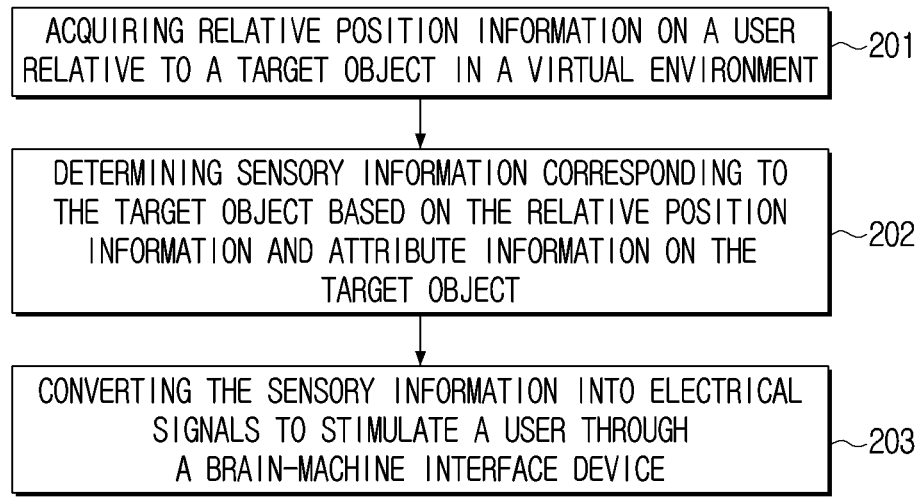
FIG. 2 is a flowchart illustrating an information generation method according an example embodiment of the disclosure.

FIG. 2 illustrates a flow diagram 200 an information generation method according to an example embodiment of the disclosure.

According to an example embodiment, the information generation method may include operation 201 of acquiring relative position information of a user relative to a target object in a virtual environment.

According to an example embodiment, a device or devices working in cooperation with each other may be referred to as an execution entity. For example, the execution entity may be the server 105 in FIG. 1, one of the terminal devices 101, 102, 103 in FIG. 1 or the server 105 working in cooperation with one of the terminal devices 101, 102, 103. According to an example embodiment, the execution entity may establish a spatial rectangular coordinate system, acquire the position information on the user in the rectangular coordinate system and the position information on the target object in the virtual environment in real time, and determine the relative position information on the user relative to the target object based on the position information on the user and the position information on the target object. According to an example embodiment, the execution entity may periodically acquire the position information on the user in the rectangular coordinate system and the position information on the target object in the virtual environment.

Here, the execution entity may acquire the position information on the user by using the related art wearable positioning device configured to be worn on a body part of the user or by using the developing technologies such as, for example, a UWB (Ultra Wide Band) system, a LANDMARK system, or the like.

Herein, the target object may be any target object in a virtual environment, for example, a table, a water cup, a bread, and the like. As such, the disclosure is not limited thereto, and as such, according to another example embodiment, other types of target objects may be provided.

In operation 202, the method includes determining sensory information corresponding to the target object based on the relative position information and the attribute information on the target object.

According to an example embodiment, after acquiring the relative position information on the user relative to the target object in the virtual environment, the execution entity may further determine the sensory information corresponding to the target object, according to a correspondence table or a sensory information prediction model. For example, the correspondence table may store predetermined relative position information, attribute information on the target object and sensory information in association with each other. According to an example embodiment, the sensory information prediction model may be a predetermined sensory information prediction model determined by performing a training operation.

According to an example embodiment, the predetermined sensory information prediction model may be obtained by training the model based on the relative position information and the attribute information samples of the target object, which are labeled with sensory information.

According to an example embodiment, the sensory information corresponding to the target object may include at least one tactility, audition, olfaction, or taste.

According to an example embodiment, the sensory information may be represented by stimulation parameters. The stimulation parameters may be determined based on sensory information actually generated by the user for the target object in the real environment.

According to an example embodiment, the stimulator may be a Blackrock CereStim™ device. However, the disclosure is not limited thereto, and as such, according to other example embodiments, various other simulators may be used. In an example scenario, in which, a user touches an object of 30 degrees Celsius, the electrode activities are recorded by using a neuroport neural signal collector. The nerve activities recorded by the electrodes was amplified, and are sampled analog to digital (A/D) at a sampling frequency of 30 kHz, and then are recorded using a neuroport neural signal processor (NSP) system. Then, the stimulation parameters may be written through a Matlab application program interface (API) of the CereStim™, and the electrode signals are acquired again by using different pulse stimulation and adjusting the current intensity. When the electrode signals are infinitely close to each other, they are stimulation parameters for touching an object of 30 degrees Celsius.

In the same way, any stimulation parameter of the tactility, audition or olfaction can be obtained.

In operation 203, the method may include converting the sensory information into electrical signals to stimulate the user through a brain-machine interface device.

According to an example embodiment, after the sensory information corresponding to the target object is determined, the execution entity may convert, by using a brain-machine interface device, the sensory information into electrical signals to stimulate the corresponding part in the cerebral cortex of the user to generate the corresponding sensation.

According to an example embodiment, the brain-machine interface device, i.e., Brain-Machine Interface (BCI), may be a direct connection channel established between a human or animal brain (or a culture of brain cells) and an external device.

According to another example embodiment, the operation of determining sensory information corresponding to the target object based on the relative position information and the attribute information on the target object may include determining olfactory information corresponding to the target object based on the orientation of the face of the user and the distance between the head of the user and the target object, and determining the olfactory information as the sensory information corresponding to the target object. According to another example embodiment, the method may include determining that the target object has an odor attribute, determining olfactory information corresponding to the target object based on the orientation of the face of the user and the distance between the head of the user and the target object, in response to or based on determining that the target object has an odor attribute, and determining the olfactory information as the sensory information corresponding to the target object.

According to an example embodiment, the relative position information includes the orientation of the user's face and the distance between the user's head and the target object. In response to determining that the target object has an odor attribute, the execution entity may determine the olfactory information corresponding to the target object based on a predetermined correspondence table according to the orientation of the user's face and the distance between the user's head and the target object, wherein the correspondence table correspondingly records the orientation of the user's face, the distance between the user's head and the target object, and the olfactory information. Then the execution entity may determine the olfactory information as the sensory information corresponding to the target object.

According to an example embodiment, the odor attribute may include attribute information such as fruit aroma, flower aroma, food aroma and the like. However, the disclosure is not limited thereto, and as such, according to another example embodiment, the odor attribute may include other odor information.

According to an example embodiment, the execution entity may determine the orientation of the user's face and the distance between the user's head and the target object, by using a related art positioning device or by using a developing technology such as, for example, a positioning device wearable on the user's eye, a positioning device wearable on both left and right sides of the user's head, or the like.

According to an example embodiment, in response to determining that the target object has an odor attribute, this implementation determines olfactory information corresponding to the target object based on the orientation of the user's face and the distance between the user's head and the target object. The olfactory information is determined as the sensory information corresponding to the target object. Further, through the brain-machine interface device, the sensory information is converted into electrical signals to stimulate the user, which helps the user to experience the odor attribute of the object in the virtual environment, and the odor concentration varies with the distance between the user and the target object, thereby effectively improving the authenticity of the interaction.

According to another example embodiment, determining sensory information corresponding to the target object based on the relative position information and the attribute information on the target object may include, in response to determining that the target object has a sound attribute, determining auditory information corresponding to the target object based on the orientation of the user's face and the distance between the user's head and the target object; and then determining the auditory information as the sensory information corresponding to the target object.

According to an example embodiment, the relative position information includes the orientation of the user's face and the distance between the user's head and the target object. According to an example embodiment, in response to determining that the target object has a sound attribute, the auditory information corresponding to the target object can be determined through a predetermined correspondence table based on the orientation of the user's face and the distance between the user's head and the target object, wherein correspondence table correspondingly records the orientation of the user's face, the distance between the user's head and the target object, and the olfactory information. The auditory information is then determined as the sensory information corresponding to the target object.

According to an example embodiment, the sound attribute may include attribute information such as a ring tone, a clock tone, and the like. However, the disclosure is not limited thereto, and as such, according to another example embodiment, the sound attribute may include other sound information.

According to an example embodiment, the execution entity may determine the orientation of the user's face and the distance between the user's head and the target object by using a positioning device in the prior art or a future development technology, for example, a wearable positioning device on the user's eye, a wearable positioning device on both left and right sides of the user's head, or the like.

According to an example embodiment, in response to determining that the target object has a sound attribute, this implementation determines auditory information corresponding to the target object based on the orientation of the user's face and the distance between the user's head and the target object. The auditory information is determined as the sensory information corresponding to the target object. Through the brain-machine interface device, the sensory information is converted into electrical signals to stimulate the user, which helps the user to experience the sound attribute of the object in the virtual environment, and the sound magnitude varies with the change of the distance between the user and the target object, thereby effectively improving the authenticity of the interaction.

According to an example embodiment, the orientation of the user's face may be determined. According to an example embodiment, the user's face orientation may be obtained by determining the coordinates of the left and right sides of the user's head based on wearable positioning devices on both left and right sides of the user's head, and determining the orientation of the user's face based on an angle between a line, which connects the coordinates of left and right sides of the user's head, and a direction of a plane, in which the coordinates of the target object are located.

According to an example embodiment, the execution entity may determine the coordinates of the left side and the coordinates of the right side of the user by using wearable positioning devices on both left and right sides of the user's head, further determine a line connecting the coordinates of the left side and the coordinates of the right side of the user's head, and determine the orientation of the face of the user based on an angle between the line and a plane direction in which the coordinates of the target object are located.

Figure 3:
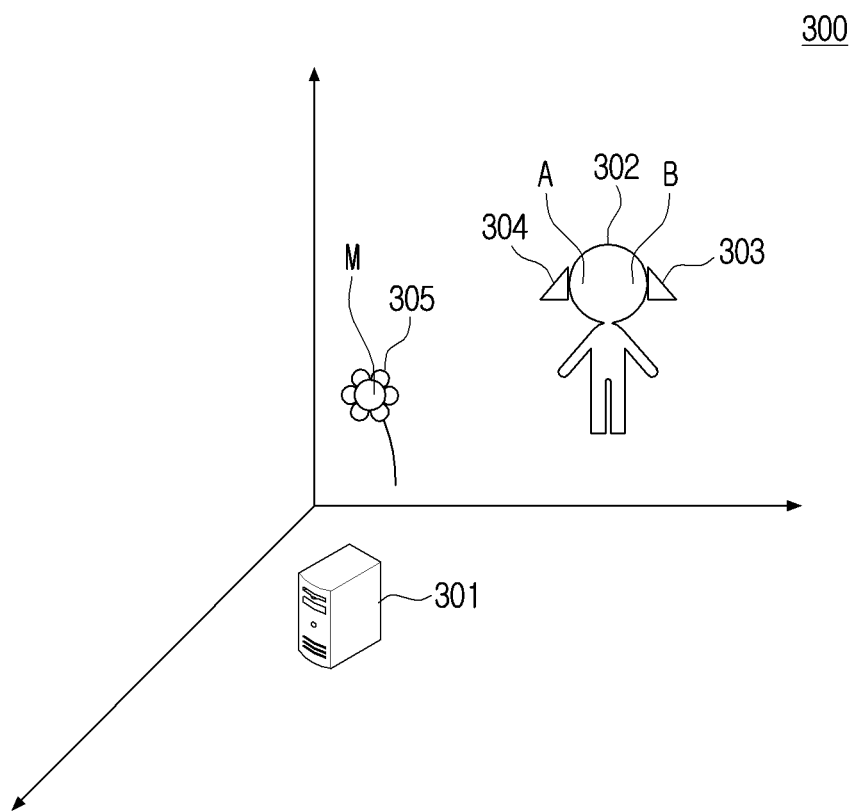
FIG. 3 is a schematic diagram of an application scenario of an information generation method according to an example embodiment of the disclosure.

FIG. 3 is a schematic diagram of an application scenario 300 of an information generation method according to an example embodiment of the disclosure. According to an example embodiment, as shown in FIG. 3, the execution entity 301 may use an UWB base station as an origin to establish a spatial rectangular coordinate system, and obtain coordinates A and B corresponding to the user's head 302 by using a first wearable positioning device 303 on a left side of the head of the user and a second wearable positioning device 304 on a right side of the head of the user. According to an example embodiment, the wearable positioning devices 303 and 304 may be UWB chips. According to an example embodiment, the UWB base station may implement by the execution entity 301. According to an example embodiment, the coordinate A corresponds to the chip 303, which is the coordinate on the left side of the user's head, and the coordinate B corresponds to the chip 304, which is the coordinate on the right side of the user's head. In the meanwhile, coordinate M of the target object 305 is obtained, and the angle between the line AB and the plane direction in which M is located is determined as the face orientation of the user. Here, the target object 305 is a virtual flower, and the execution entity may determine, from the predetermined correspondence table, the olfactory information corresponding to the target object based on the face orientation of the user and the distance between the user head and the target object, and determine the olfactory information as the sensory information corresponding to the target object. The correspondence table correspondingly records the face orientation of the user, the distance between the user head and the target object, and the olfactory information in association with each other.

In this implementation, the coordinates of the left and right sides of the user's head are determined based on the wearable positioning devices on the left and right sides of the user's head; The orientation of the user's face is determined based on an angle between a line, which connects the coordinates of left and right sides of the user's head, and a direction of a plane, in which the coordinates of the target object are located, thereby effectively improving the accuracy of the determined orientation of the user's face.

According to another example embodiment, the distance between the user's head and the target object may be determined by determining the coordinates of the left and right sides of the user's head based on wearable positioning devices on the left and right sides of the user's head. The distance between the user's head and the target object is determined based on the distance between the coordinate of the midpoint of the left and right sides of the user's head and the coordinate of the target object.

According to an example embodiment, the execution entity may determine the coordinate of the left side and the coordinate of the right side of the user by using wearable positioning devices on both left and right sides of the user's head, determine the midpoint of the left side and the right side of the user's head, and determine the distance between the user's head and the target object based on the distance between the coordinate of the midpoint and the coordinates of the target object.

According to an example embodiment, the execution entity may use a UWB base station as an origin to establish a spatial rectangular coordinate system, and obtain coordinates A and B of a user's head by using wearable positioning devices on both left and right sides of the user's head. For example, the wearable positioning devices may be a UWB chip, and the coordinate A is the coordinate on the left side of the user's head, and the coordinate B is the coordinate on the right side of the user's head. The execution entity may further obtain the coordinate M of the target object at the same time, and determine distances from the midpoint of the coordinates A and B to the coordinate M as the distance from the user's head to the target object. Here, the target object is a virtual bell, and the execution entity can determine auditory information on the target object from a predetermined correspondence table based on the orientation of the user's face and the distance between the user's head and the target object, and determine the auditory information as the sensory information corresponding to the target object. The predetermined correspondence table correspondingly records the orientation of the user's face, the distance between the user's head and the target object, and the auditory information in association with each other.

According to an example embodiment, the coordinates of the left and right sides of the user's head are determined based on the wearable positioning devices on the left and right sides of the user's head. The distance between the user's head and the target object is determined based on the distance between the coordinate of the midpoint of the left and right sides of the user's head and the coordinate of the target object, thereby improving the accuracy of the determined distance between the user's head and the target object.

According to an example embodiment, the operation of determining sensory information corresponding to the target object based on the relative position information and the attribute information on the target object includes determining taste information corresponding to the edible attribute as the sensory information corresponding to the target object, in response to determining that the target object is at a predetermined position on the user's head and that the target object has an edible attribute.

According to an example embodiment, the execution entity can detect the relative position information on the user's head relative to the target object, and determine the taste information corresponding to the edible attribute as the sense information corresponding to the target object, in response to determining that the target object is at the predetermined position of the user's head and that the target object has the edible attribute.

According to an example embodiment, the taste attributes may include attribute information such as banana taste, apple taste, and the like.

According to an example embodiment, the predetermined position may be set according to experience and actual requirements. For example, the predetermined position may be a midpoint of the line connecting the left and right side coordinates of the user's head, or a position within a predetermined range centered on the midpoint position. However, the disclosure is not limited, and as such according to another example embodiment, the predetermined position may set in another manner.

Specifically, the execution entity uses the UWB base station as an origin to establish a spatial rectangular coordinate system, and uses a wearable positioning device on the user's head, such as a UWB chip, to acquire the coordinate of the user's head, while acquiring the coordinates of the target object. Here, the target object is a virtual bread and has an edible attribute, and the taste information corresponding to the edible attribute is determined as the sensory information corresponding to the target object, in response to determining that the target object is located at the midpoint of the line connecting the left-right coordinates of the user's head.

It should be noted that there may be a user's action for touching the target object or there may not be the user's action for touching the target object within a predetermined time range before it is determined that the target object is located at the predetermined position of the user's head. However, the disclosure is not limited thereto, and as such, according to another example embodiment, the user's action for touching the target object may be determined in a different manner.

For example, according to another example embodiment, it can be determined whether there is the user's action for touching the virtual object or not by determining whether or not the distance between the user's hand and the target object meets a predetermined threshold.

In this implementation, the taste information corresponding to the edible attribute is determined as the sensory information corresponding to the target object, in response to determining that the target object is in a predetermined position on the user's head, and that the target object has the edible attribute. The sensory information then is converted into an electric signal to stimulate the user through the brain-machine interface device, thereby helping the user to experience the edible attribute of the object in the virtual environment and improving the authenticity of the interaction.

Figure 4:
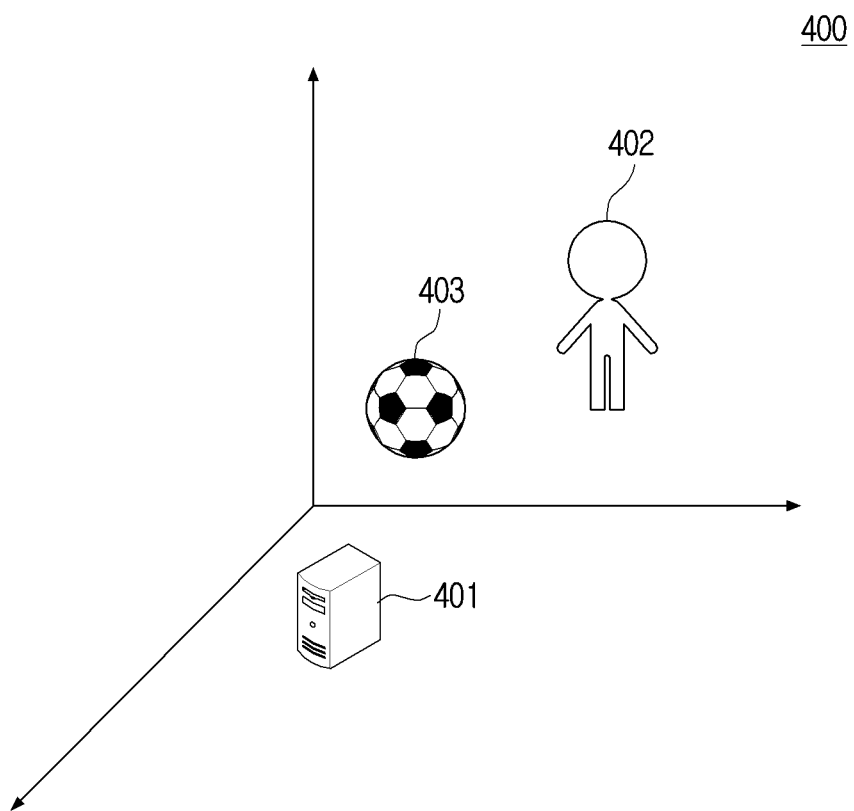
FIG. 4 is a schematic diagram of yet another application scenario of an information generation method according to an example embodiment of the disclosure.

FIG. 4 is a schematic diagram of an application scenario 400 of an information generation method according to another example embodiment.

In the application scenario of FIG. 4, the execution entity 401 may establish the spatial rectangular coordinate system by using the UWB base station as the origin, and acquire the position information on the user in the spatial rectangular coordinate system by using wearable positioning devices on one or more both parts of the user 402. For example, the wearable positioning devices may be provided on a hand and a head of the user. According to an example embodiment, the UWB base station may implement by the execution entity 401. According to an example embodiment, the entity may acquire the position information on the target object 403, such as the virtual soccer ball, so as to determine the relative position information on the user relative to the target object based on the position information on the user and the position information on the target object. Further, the sensory information corresponding to the target object is determined based on the correspondence table, in which the predetermined relative position information, and the attribute information (e.g., smoothness, softness, etc.) of the target object, and the sensory information are correspondingly recorded. Then, the sensory information is converted into electrical signals to stimulate the user 402 through the brain-machine interface device.

According to an example embodiment, the information generation method may include acquiring the relative position information of a user relative to a target object in a virtual environment, determining the sensory information corresponding to the target object based on the relative position information and the attribute information on the target object, and converting, through the brain-machine interface device, the sensory information into electrical signals to stimulate the user, which helps the user to experience the attributes of the objects in the virtual environment and improve the authenticity of the interaction.

Figure 5:
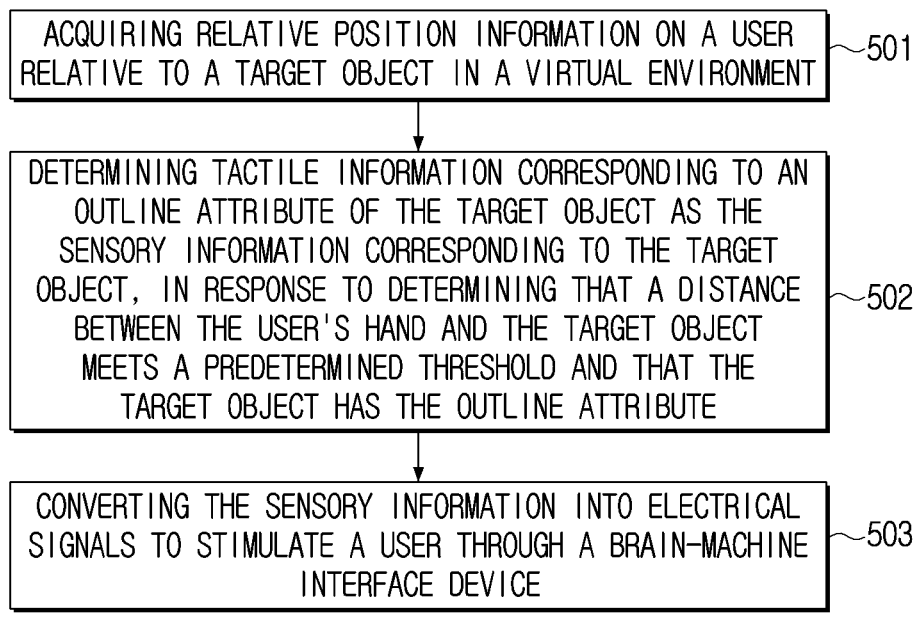
FIG. 5 is a flowchart of yet another embodiment of an information generation method according to an example embodiment of the disclosure.

FIG. 5 is a flow diagram 500 of an information generation method according to another example embodiment.

According to FIG. 5, the information generation method may, in operation 501, acquiring relative position information of a user relative to a target object in a virtual environment.

According to an example embodiment, the implementation details and technical effects of operation 501 have been described with reference to step 201, and thus details are not repeated herein.

In operation 502, the method may include, in response to determining that the distance between the user's hand and the target object meets a predetermined threshold, and that the target object has an outline attribute, determining the tactile information corresponding to the outline attribute of the target object as the sensory information corresponding to the target object.

According to an example embodiment, the relative position information may include the relative position information on the user's hand relative to the target object, the execution entity can detect the distance between the user's hand and the target object. In response to determining that the distance between the user's hand (finger and/or palm) and the target object meets a predetermined threshold, and the target object has an outline attribute, the tactile information corresponding to the outline attribute of the target object is determined as the sensory information corresponding to the target object.

Herein, the outline attribute may include attribute information such as outline, material quality, texture, smoothness, temperature, quality, and the like.

Herein, the predetermined thresholds may be set according to experience, actual requirements, and a specific application scenario. For example, the distance between the finger and/or palm and the target object is less than or equal to 1 cm, or the distance between the finger and/or palm and the target object is less than or equal to 0.5 cm, which is not limited in the disclosure.

Specifically, the execution entity uses the UWB base station as the origin to establish the spatial rectangular coordinate system, and acquires the position information on the user's hand by using the data gloves wearable on the user's hand (the finger and the palm are provided with the UWB positioning chip in the gloves), while acquiring the position information on the target object. The target object is a water cup, and the predetermined threshold is that the distance between the finger and/or the palm of the user and the target object is equal to or less than 1 cm. In response to determining that the distance between the finger and/or the palm of the user and the water cup meets a predetermined threshold, and that the water cup has an outline attribute, the tactile information corresponding to the outline attribute of the water cup is determined as the sensory information corresponding to the water cup.

In operation 503, the method may include converting, through the brain-machine interface device, the sensory information into electrical signals to stimulate the user.

According to an example embodiment, the implementation details and technical effects of operation 503 have been described with reference to operation 203, and details thereof are not repeated herein.

Compared with the method illustrated in the example embodiment in FIG. 2, according to the method illustrated in the flow diagram 500 in FIG. 5, in response to determining that the distance between the user's hand and the target object meets a predetermined threshold, and that the target object has an outline attribute, the tactile information corresponding to the outline attribute of the target object is determined as the sensory information corresponding to the target object, and the sensory information is converted into an electric signal to stimulate the user through the brain-machine interface device, which helps the user to experience the outline attribute of the object in the virtual environment and improves the authenticity of the interaction.

Figure 6:
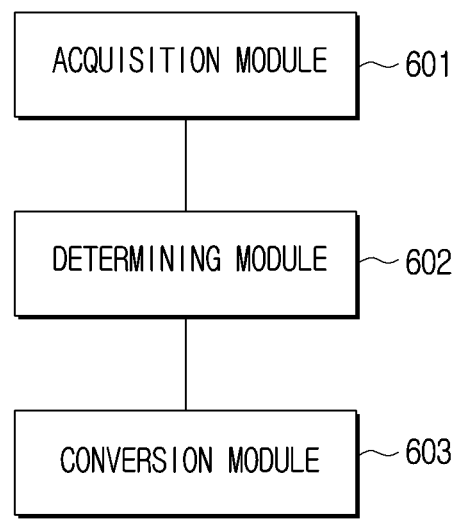
FIG. 6 is a schematic diagram of an embodiment of an information generating apparatus according to an example embodiment of the disclosure.

With further reference to FIG. 6, as an implementation of the method shown in each of the above figures, the disclosure provides an embodiment of an information generating apparatus, which corresponds to the method embodiment shown in FIG. 1, and is particularly applicable to various electronic devices.

As shown in FIG. 6, the information generation apparatus 600 of the present embodiment includes an acquisition module 601, a determination module 602, and a conversion module 603. According to an example embodiment, the modules illustrated in FIG. 6 may be implemented by hardware, software or a combination of hardware and software.

According to an example embodiment, the acquiring module 601 may be configured to acquire the relative position information on the user relative to the target object in the virtual environment.

According to an example embodiment, the determination module 602 may be configured to determine sensory information corresponding to the target object based on the relative position information and the attribute information on the target object.

According to an example embodiment, the conversion module 603 may be configured to convert the sensory information into electrical signals to stimulate a user through a brain-machine interface device.

According to another example embodiment, in response to determining that the distance between the user's hand and the target object meets a predetermined threshold, and that the target object has an outline attribute, the determining module is further configured to determine the tactile information corresponding to the outline attribute of the target object as the sensory information corresponding to the target object.

According to another example embodiment, in response to determining that the target object has an odor attribute, the determination module is further configured to determine olfactory information corresponding to the target object based on the orientation of the user's face and the distance between the user's head and the target object; and then determine the olfactory information as the sensory information corresponding to target object.

According to another example embodiment, in response to determining that the target object has a sound attribute, the determining module is further configured to determine auditory information corresponding to the target object based on the orientation of the user's face and the distance between the user's head and the target object, and then determine the auditory information as the sensory information corresponding to the target object.

According to another example embodiment, the orientation of the user's face is determined by using the wearable positioning devices on the left and right sides of the user's head to determine the coordinates of the left and right sides of the user's head. The orientation of the user's face is determined based on the angle between a line, which connects the coordinates of left and right sides of the user's head, and a direction of a plane, in which the coordinates of the target object are located.

According to another example embodiment, the distance between the user's head and the target object is determined by using wearable positioning devices on the left and right sides of the user's head to determine the coordinates of the left and right sides of the user's head, and determine the distance between the user's head and the target object based on the distance between the coordinates of the midpoint of the coordinates on the left and right sides of the user's head and the coordinates of the target object.

According to another example embodiment, the determination module is further configured to determine the taste information corresponding to the edible attribute as the sensory information corresponding to the target object, in response to determining that the target object is in a predetermined position on the user's head and that the target object has the edible attribute.

According to an embodiment of the disclosure, the disclosure also provides an electronic device and a readable storage medium.

Figure 7:
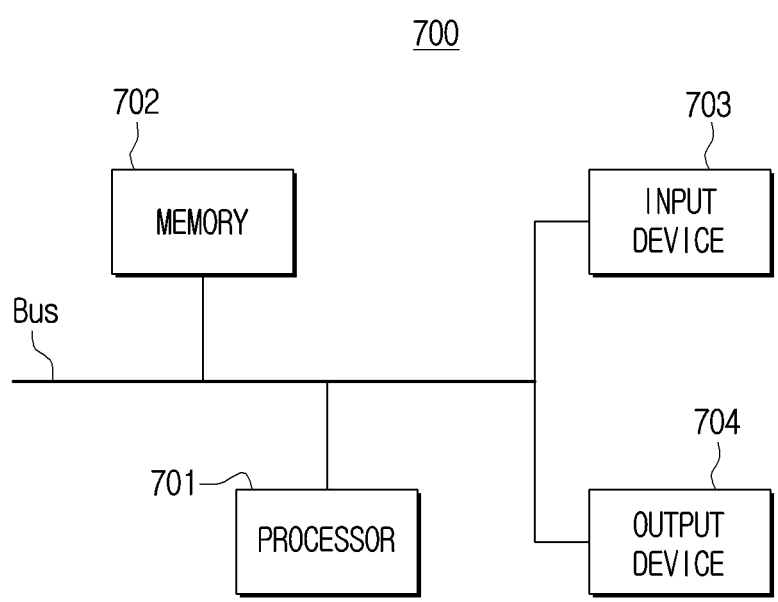
FIG. 7 is a schematic structural diagram of a computer system suitable for implementing a server of an example embodiment of the disclosure.

FIG. 7 is a block diagram of an electronic apparatus 700 for implementing an information generation method according to an example embodiment of the disclosure.

According to an example embodiment, electronic device 700 may be implemented as various digital computers, laptop computers, desktop computers, worktables, personal digital assistants, servers, blade servers, mainframe computers, and other suitable computers. According to an example embodiment, electronic device 700 may also be implemented as various mobile devices, such as personal digital processing, cellular telephones, smart phones, wearable devices, and other similar computing devices. The components shown herein, their connections and relationships, and their functions are by way of example only and are not intended to limit the implementation of the disclosure as described and/or claimed herein.

As shown in FIG. 7, the electronic device 700 may include one or more processors 701, a memory 702, and interfaces for connecting components, including a high speed interface and a low speed interface. The various components are interconnected by different buses and may be mounted on a common motherboard or otherwise as desired. The processor may process instructions executed within the electronic device, including instructions stored in or on a memory to display graphical information on the GUI on an external input/output device, such as a display device coupled to an interface. In other embodiments, multiple processors and/or multiple buses may be used with multiple memories and multiple memories, if desired. Similarly, a plurality of electronic devices may be connected, each providing a portion of the necessary operations (e.g., as a server array, a set of blade servers, or a multiprocessor system). One processor 701 is exemplified in FIG. 7, but the disclosure is not limited thereto. As such, according to an another example embodiment, multiple processors may be provided According to an example embodiment, the memory 702 may be a computer readable storage medium provided in this application. According to an example embodiment, the memory 702 may store instructions executable by at least one processor to cause the at least one processor to perform the information generation method provided herein. According to an example embodiment, the memory 702 may store computer instructions for causing a computer to perform the information generation method provided in the disclosure.

According to an example embodiment, the memory 702 may store non-instantaneous software programs, non-instantaneous computer executable programs, and modules, such as program instructions/modules corresponding to the information generation method in the embodiment of the disclosure (for example, the acquisition module 601, the determination module 602, and the conversion module 603 shown in FIG. 6). The processor 701 executes various functional applications and data processing of the server by running non-instantaneous software programs, instructions and modules stored in the memory 702, that is, implements the information generation method in the above-described method embodiment.

The memory 702 may include a storage program area and a storage data area, wherein the storage program area may store an operating system, an application program required for at least one function; The storage data area may store data or the like created by the use of the information-generated electronic device. In addition, memory 702 may include high speed random access memory, and may also include non-instantaneous memory, such as at least one magnetic disk storage device, flash memory device, or other non-instantaneous solid state storage device. In some embodiments, memory 702 may optionally include remotely disposed memory relative to processor 701, which may be connected to the information-generating electronic device via a network. Examples of such networks include, but are not limited to, the Internet, enterprise intranets, local area networks, mobile communication networks, and combinations thereof.

The electronic apparatus 700 may further include input means 703 and output means 704. The processor 701, the memory 702, the input device 703, and the output device 704 may be connected via a bus or otherwise, as illustrated in FIG. 7.

The input device 703 may receive input digital or character information, and generate key signal input related to user settings and functional control of an electronic device for quality monitoring of a live video stream, such as a tactility screen, a keypad, a mouse, a track pad, a tactility pad, a pointer bar, one or more mouse buttons, a track ball, a joystick, and the like. The output device 704 may include a display device, an auxiliary lighting device (e.g., an LED), a tactility feedback device (e.g., a vibration motor), and the like. The display device may include, but is not limited to, a liquid crystal display (LCD), a light emitting diode (LED) display, and a plasma display. In some embodiments, the display device may be a tactility screen.

The various embodiments of the systems and techniques described herein may be implemented in digital electronic circuit systems, integrated circuit systems, application specific ASICs (application specific integrated circuits), computer hardware, firmware, software, and/or combinations thereof. These various embodiments may include being implemented in one or more computer programs that may execute and/or interpret on a programmable system including at least one programmable processor, which may be a dedicated or general purpose programmable processor, may receive data and instructions from a memory system, at least one input device, and at least one output device, and transmit the data and instructions to the memory system, the at least one input device, and the at least one output device.

These computing programs (also referred to as programs, software, software applications, or code) include machine instructions of a programmable processor and may be implemented in high-level procedures and/or object-oriented programming languages, and/or assembly/machine languages. As used herein, the terms "machine-readable medium" and "computer-readable medium" refer to any computer program product, device, and/or device (e.g., magnetic disk, optical disk, memory, programmable logic device (PLD)) for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and techniques described herein may be implemented on a computer having a display device (e.g., a CRT (cathode ray tube) or LCD (liquid crystal display) monitor) for displaying information to the user; And a keyboard and a pointing device (e.g., a mouse or a trackball) through which a user can provide input to a computer. Other types of devices may also be used to provide interaction with a user; For example, the feedback provided to the user may be any form of sensory feedback (e.g., visual feedback, auditory feedback, or tactility feedback); And input from the user may be received in any form, including acoustic input, speech input, or tactility input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), and the Internet. According to an example embodiment, the modules illustrated throughout the disclosure may be implemented by hardware, software or a combination of hardware and software. For example, in a case, the module is a hardware, the module may be implemented by a processor or a circuit. In a case, the module is a software, the module may be implemented by a memory storing one or more computer instructions or codes, and a processor configured to execute the one or more instructions to perform the methods illustrated in the disclosure.

The computer system may include a client and a server. The client and server are typically remote from each other and typically interact through a communication network. The relationship between the client and the server is generated by a computer program running on the corresponding computer and having a client-server relationship with each other.

According to the technical solution of the embodiment of the disclosure, the user can sensory the attribute of the object in the virtual environment and improve the authenticity of the interaction.

It is to be understood that the above discussed various ways of one or more steps may be reordered, added or deleted. For example, the steps described in the disclosure may be performed in parallel or sequentially or in a different order, so long as the desired results of the technical solution disclosed in the disclosure can be realized, and no limitation is imposed herein.

The foregoing detailed description does not intend to limit the scope of the present invention. It will be appreciated by those skilled in the art that various modifications, combinations, sub-combinations, and substitutions may be made depending on design requirements and other factors. Any modifications, equivalents, and modifications that fall within the spirit and principles of this application intend to be included within the scope of this application.

What is claimed is:

1. An information generation method comprising:
acquiring position information of a user in a virtual environment;

determining sensory information corresponding to a target object in the virtual environment based on attribute information of the target object and the position information of the user; and converting the sensory information into electrical signals to stimulate the user through a brain-machine interface device, wherein the acquiring the position information of the user in the virtual environment comprises:

obtaining first coordinates corresponding to a first positioning device at a first location on the user and second coordinates corresponding to a second positioning device at a second location on the user, and acquiring the position information of the user in the virtual environment based on the first coordinates and the second coordinates.

2. The method of claim 1, wherein the determining the sensory information corresponding to the target object in the virtual environment comprises:

obtaining relative position information between the position information of the user and a position information of the target object; and determining the sensory information corresponding to the target object based on the relative position information and the attribute information of the target object.

3. The method of claim 2, wherein the determining the sensory information corresponding to the target object based on the relative position information and the attribute information on the target object comprises:

determining tactile information corresponding to an outline attribute of the target object as the sensory information corresponding to the target object, based on determining that a distance between a hand of the user and the target object satisfies a threshold and determining that the target object has the outline attribute.

4. The method of claim 2, wherein the determining the sensory information corresponding to the target object based on the relative position information and the attribute information on the target object comprises:

determining olfactory information corresponding to the target object based on an orientation of a face of the user and a distance between a head of the user and the target object, based on determining that the target object has an odor attribute; and determining the olfactory information as the sensory information corresponding to the target object.

5. The method of claim 4, wherein the orientation of the face of the user is determined by:

determining the first coordinates corresponding to a left side of the head of the user based on the first positioning device on a left side of the head of the user and the second coordinates corresponding to a right side of the head of the user based on the second positioning device on a right side of the head of the user; and determining the orientation of the face of the user based on an angle between a line connecting, the first coordinates and the second coordinates, and a direction of a plane, in which third coordinates of the target object are located.

6. The method of claim 4, wherein the distance between a head of the user and the target object is determined by:

determining the first coordinates corresponding to a left side of the head of the user based on the first positioning device on a left side of the head of the user and the second coordinates corresponding to a right side of the head of the user based on the second positioning device on a right side of the head of the user; and determining the distance between the head of the user and the target object based on a distance between third coordinates of the target object and a midpoint between the first coordinates and the second coordinates.

7. The method of claim 2, wherein the determining the sensory information corresponding to the target object based on the relative position information and the attribute information on the target object comprises:

determining auditory information corresponding to the target object based on an orientation of a face of the user and a distance between a head of the user and the target object, based on determining that the target object has a sound attribute; and determining the auditory information as the sensory information corresponding to the target object.

8. The method of claim 2, wherein the determining the sensory information corresponding to the target object based on the relative position information and the attribute information on the target object comprises:

determining taste information corresponding to an edible attribute of the target object as the sensory information corresponding to the target object based on determining that the target object is in a position on a head of the user and that the target object has the edible attribute.

9. The method of claim 1, wherein the first coordinates and the second coordinates are in a spatial coordinate system established by an Ultra Wide Band (UWB) base station provided as an origin.

10. The method of claim 1, wherein the first location on the user is a left side of a head of the user and the second location on the user is a right side of the head of the user; and wherein an orientation of a face of the user is determined based on an angle between a line connecting, the first coordinates and the second coordinates, and a direction of a plane, in which third coordinates of the target object are located.

11. The method of claim 1, wherein the first location on the user is a left side of a head of the user and the second location on the user is a right side of the head of the user; and wherein a distance between the head of the user and the target object is determined based on a distance between third coordinates of the target object and a midpoint between the first coordinates and the second coordinates.

12. A non-transitory computer readable storage medium storing computer instructions for causing the computer to perform the method of claim 1.

13. An information generating apparatus comprising:

an acquisition circuit configured to:

obtain first coordinates corresponding to a first positioning device at a first location on a user and second coordinates corresponding to a second positioning device at a second location on the user; and acquire position information of the user in a virtual environment based on the first coordinates and the second coordinates;

a determining circuit configured to determine sensory information corresponding to a target object in the virtual environment based on attribute information of the target object and the position information of the user; and a conversion circuit configured to convert the sensory information into electrical signals to stimulate the user through a brain-machine interface device.

14. The information generating apparatus of claim 13, wherein the determining circuit is further configured to:
obtain relative position information between the position information of the user and a position information of the target object; and
determine the sensory information corresponding to the target object based on the relative position information and the attribute information of the target object.

15. An electronic device comprising:
a memory storing one or more instructions; and
at least one processor configured to execute the one or more instructions to:
obtain first coordinates corresponding to a first positioning device at a first location on a user and second coordinates corresponding to a second positioning device at a second location on the user;
acquire position information of the user in a virtual environment based on the first coordinates and the second coordinates;
determine sensory information corresponding to a target object in the virtual environment based on attribute information on the target object and the position information of the user; and
convert the sensory information into electrical signals to stimulate the user through a brain-machine interface device.

16. The electronic device of claim 15, wherein the processor is further configured to:
obtain relative position information between the position information of the user and a position information of the target object; and
determine the sensory information corresponding to the target object based on the relative position information and the attribute information of the target object.

* * * * *